United States Patent
Zhang et al.

(10) Patent No.: US 12,449,895 B2
(45) Date of Patent: Oct. 21, 2025

(54) PRESENTATION DEVICE ACTIONS BASED ON HEAD POSITIONS

(71) Applicant: HEWLETT-PACKARD DEVELOPMENT COMPANY, L.P., Spring, TX (US)

(72) Inventors: Peter Siyuan Zhang, Spring, TX (US); Hsin-Chin Lin, Taipei (TW); Cheng-Chien Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 399 days.

(21) Appl. No.: 17/975,357

(22) Filed: Oct. 27, 2022

(65) Prior Publication Data

US 2024/0143070 A1 May 2, 2024

(51) Int. Cl.
*G06F 3/01* (2006.01)
*G06V 10/774* (2022.01)
*G06V 10/82* (2022.01)
*G06V 40/16* (2022.01)

(52) U.S. Cl.
CPC ............ *G06F 3/012* (2013.01); *G06V 10/774* (2022.01); *G06V 10/82* (2022.01); *G06V 40/172* (2022.01)

(58) Field of Classification Search
CPC ..... G06F 3/012; G06F 3/0304; G06V 10/774; G06V 10/82; G06V 40/172; G06V 10/764; G06V 40/103
See application file for complete search history.

(56) References Cited

U.S. PATENT DOCUMENTS

| | | | | |
|---|---|---|---|---|
| 8,537,196 B2* | 9/2013 | Hegde | ............... | H04N 7/157 348/14.09 |
| 9,503,687 B2* | 11/2016 | Kratz | ............... | G06T 7/246 |
| 9,965,697 B2* | 5/2018 | Chew | ............... | G06F 3/013 |
| 10,582,117 B1 | 3/2020 | Tanaka et al. | | |
| 11,652,957 B1* | 5/2023 | Sculley | ............... | H04N 7/15 348/14.02 |
| 11,736,801 B2* | 8/2023 | Bushman | ............... | G06F 3/013 348/36 |
| 11,747,899 B2* | 9/2023 | Chen | ............... | G09G 5/14 715/722 |
| 12,046,261 B1* | 7/2024 | Libin | ............... | G06V 40/15 |
| 12,081,906 B2* | 9/2024 | Chu | ............... | H04N 7/15 |
| 12,107,904 B2* | 10/2024 | Okumura | ............... | H04M 3/565 |
| 12,154,287 B2* | 11/2024 | Bhatt | ............... | G06V 40/10 |
| 2009/0051756 A1* | 2/2009 | Trachtenberg | ............... | H04N 7/142 348/E7.083 |
| 2014/0063176 A1* | 3/2014 | Modai | ............... | H04N 23/611 348/14.05 |
| 2014/0109210 A1 | 4/2014 | Borzycki et al. | | |
| 2014/0184550 A1* | 7/2014 | Hennessey | ............... | G06F 3/041 345/173 |
| 2018/0161135 A1* | 6/2018 | Davidov | ............... | A61C 15/043 |

(Continued)

*Primary Examiner* — Wesley J Tucker
(74) *Attorney, Agent, or Firm* — Quarles & Brady LLP (57) ABSTRACT

In examples, an electronic device comprises a camera to capture an image of a space and a processor coupled to the camera. The processor is to receive the image of the space from the camera; identify a person in the image and a presentation device in the image; identify a head position of the person based on the image; determine whether the person is viewing the presentation device based on the head position; and perform an action relating to the presentation device based on the determination.

20 Claims, 5 Drawing Sheets

(56) References Cited

U.S. PATENT DOCUMENTS

| | | | |
|---|---|---|---|
| 2019/0147607 A1* | 5/2019 | Stent | G06N 3/045 |
| | | | 382/103 |
| 2020/0050263 A1* | 2/2020 | Wu | G06F 3/013 |
| 2020/0193859 A1* | 6/2020 | Holstein | G09B 7/00 |
| 2021/0319408 A1* | 10/2021 | Jorasch | H04L 12/1827 |
| 2022/0329727 A1* | 10/2022 | Bryan | H04N 23/64 |
| 2023/0128024 A1* | 4/2023 | Du | G09B 5/14 |
| | | | 345/419 |

* cited by examiner

FIG. 2

- receive an image of the space from the camera
- identify a person in the image and a presentation device in the image
- identify a head position of the person based on the image
- determine whether the person is viewing the presentation device based on the head position
- perform an action relating to the presentation device based on the determination

Storage 304

Camera 302

Processor 300

- receive an image of a meeting space from an imaging device
- identify a person and first and second presentation devices in the image
- identify relative positions between the person and the first and second presentation devices
- determine which of the first and second presentation devices the person is viewing based on a pitch, yaw, and roll of a head position of the person
- perform an action to control the first presentation device based on the determination

Storage 404

Camera 402

Processor 400

PRESENTATION DEVICE ACTIONS BASED ON HEAD POSITIONS

BACKGROUND

Meetings are often conducted in-person. During a meeting, a presenter may use various presentation devices, such as televisions, projectors, and whiteboards. Such presentation devices may include features that make the presentation devices easier or more difficult to observe. For example, a presentation device may be turned on or off, illuminated, darkened, increased in volume, decreased in volume, etc.

BRIEF DESCRIPTION OF THE DRAWINGS

Various examples will be described below referring to the following figures.

DETAILED DESCRIPTION

In-person meetings may include the use of presentation devices, such as televisions, projectors and whiteboards. In some cases, a meeting space may include multiple such presentation devices. Presenters may switch from one presentation device to another one or more times during the course of a meeting. Each time a presenter switches the presentation device being used, the presentation devices should be controlled, for example by turning one presentation device on and another presentation device off, or by increasing the illumination level of one presentation device while decreasing the illumination level of another presentation device, or by adjusting audio volume levels of the presentation devices. Such adjustments are tedious, time-consuming, and lead to inefficient use of the meeting attendees' time. Further, failing to perform such adjustments can detract from the quality of the meeting, for example by distracting attendees from the content being presented. Failing to perform such adjustments can also result in an environmentally-unfriendly level of power waste.

This disclosure describes various examples of an electronic device that mitigates the challenges described above by monitoring the head positions (e.g., pitch, yaw, and roll) of the meeting attendees and determining, based on these head positions, which of multiple presentation devices is being used in the meeting. The electronic device may control the presentation device being used by performing actions such as increasing illumination level and increasing audio volume output. The electronic device may control the presentation device(s) not being used by performing actions such as decreasing illumination level and deceasing audio volume output, or by turning off the presentation device. The electronic device may also control other devices in the meeting space, such as window blinds and curtains, to facilitate observation of the presentation device being used. In this disclosure, the term "active presentation device" refers to a presentation device that is currently being used or that will imminently be used in a meeting space, as determined based on meeting attendees' head positions (e.g., pitch, yaw, and roll). The term "inactive presentation device" refers to a presentation device that is currently not being used or that will imminently cease to be used in a meeting space, as determined based on meeting attendees' head positions.

Figure 1:
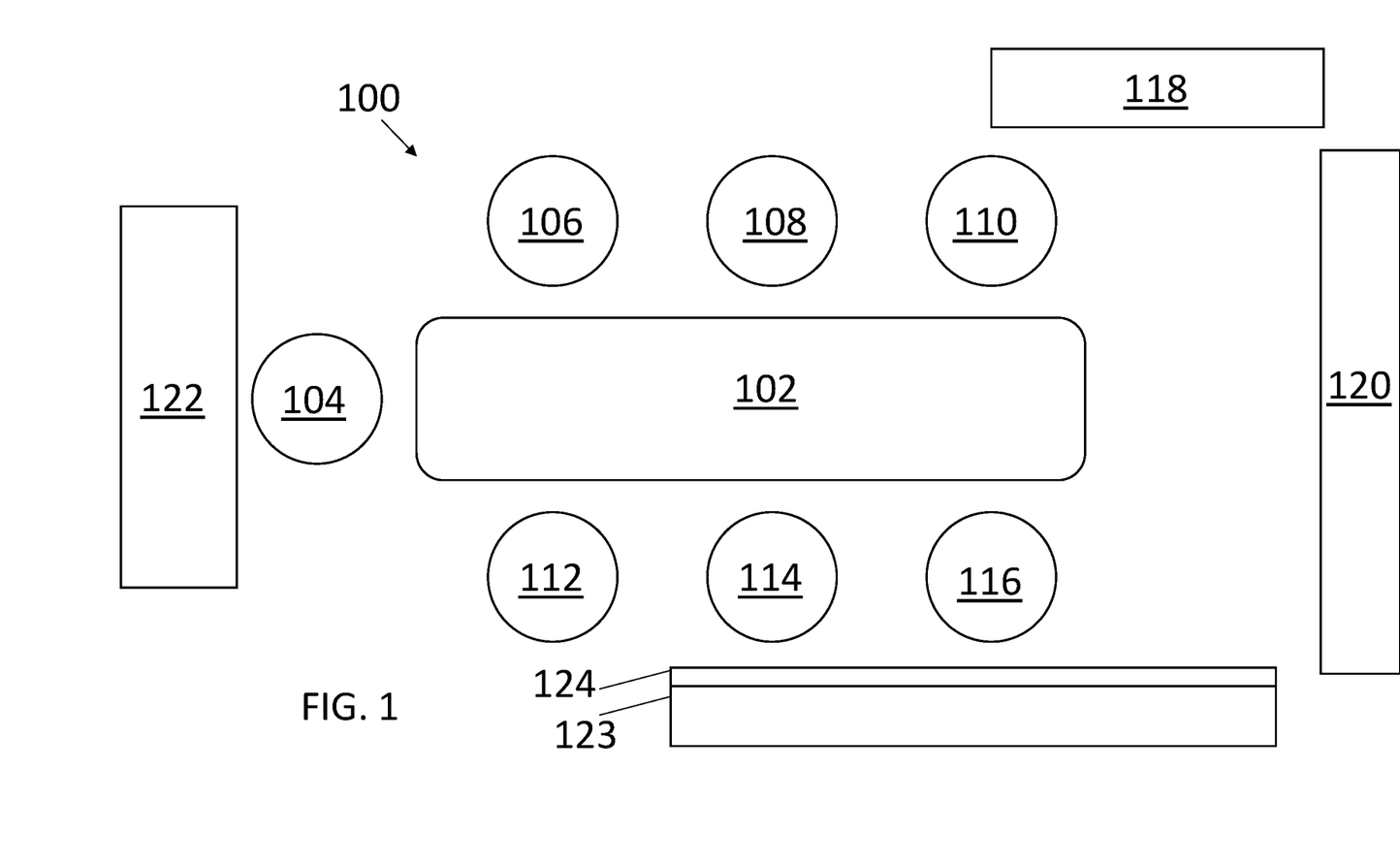
FIG. 1 is a schematic diagram of a meeting room having multiple attendees and multiple presentation devices, in accordance with various examples.

FIG. 1 is a schematic diagram of a meeting room 100, in accordance with various examples. The meeting room 100 includes a conference table 102. Attendees 104, 106, 108, 110, 112, 114, and 116 are seated around the conference table 102. The meeting room 100 also includes presentation devices 118, 120. For example, the presentation device 118 may be a whiteboard (e.g., an interactive whiteboard) and the presentation device 120 may be a projector. Other presentation devices may be used, such as televisions, speakers, and computers.

The meeting room 100 also includes an electronic device 122. The electronic device 122 may include a camera to capture images and/or video streams of a meeting being conducted in the meeting room 100. The electronic device 122 also includes a processor coupled to the camera. The processor receives the images and/or video streams from the camera. The processor identifies attendees and presentation devices in the images and/or video streams. The processor monitors the head positions of the attendees 104, 106, 108, 110, 112, 114, and 116 relative to the presentation devices 118, 120 in the meeting room 100. When a threshold number of the attendees' head positions indicate observation of a particular presentation device 118, 120, the processor may facilitate observation of that presentation device 118, 120 and impede viewing of the other presentation device 118, 120. For example, the processor of the electronic device 122 may turn on, illuminate, increase the sound volume of, capture an image of, or control the content shown by the presentation device 118, 120 that is being observed or that is about to be observed, and the processor may turn off, darken, or decrease the sound volume of the presentation device 118, 120 that is not being observed or that will shortly cease to be observed. In examples, the processor of the electronic device 122 may manipulate a window 123 or a window treatment 124, such as window blinds or curtains.

Figure 2:
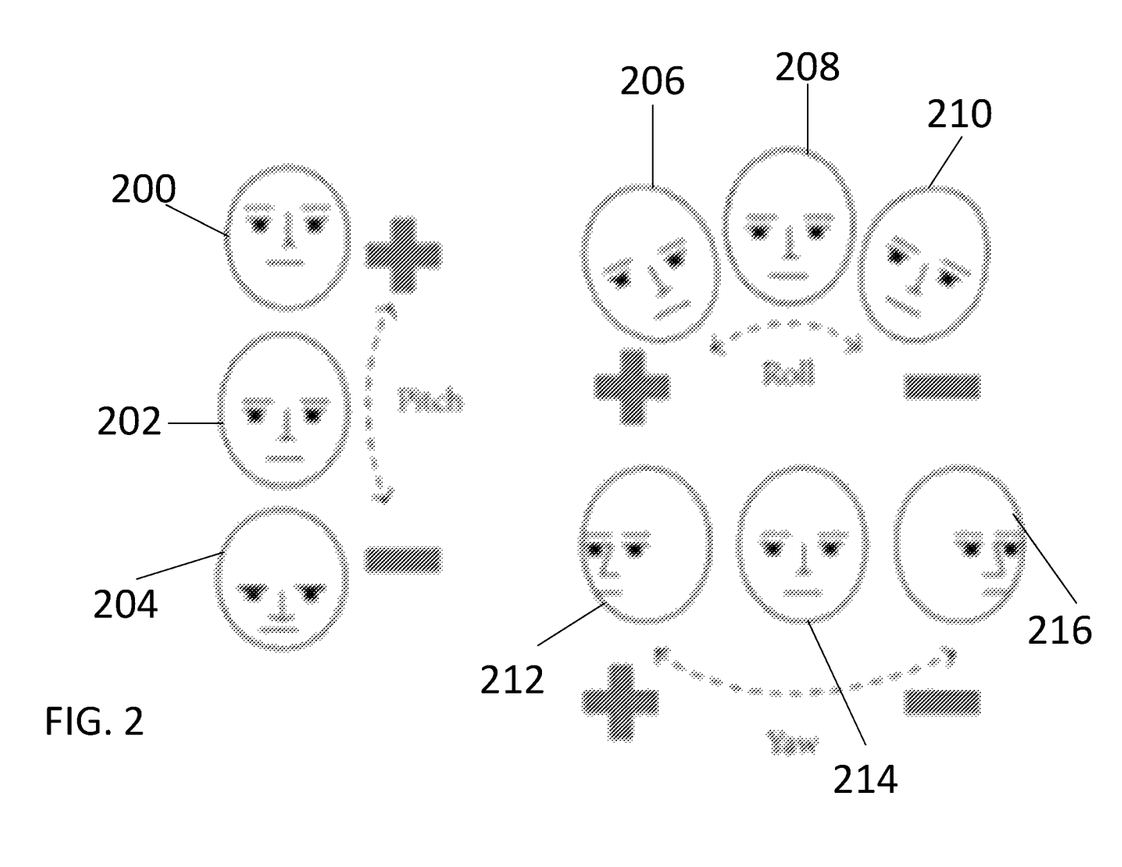
FIG. 2 is a schematic diagram showing example head positions of meeting attendees, in accordance with various examples.

FIG. 2 is a schematic diagram showing example head positions of meeting attendees 104, 106, 108, 110, 112, 114, and 116, in accordance with various examples. Head positions are expressed in terms of roll, pitch, and yaw. Numeral 202 shows an attendee head facing forward, with no pitch bias. Numeral 200 shows a positive pitch (e.g., head facing upward) and numeral 204 shows a negative pitch (e.g., head facing downward). Numeral 208 shows an attendee head with no roll bias. Numeral 206 shows a positive roll (e.g., head tilted to its right) and numeral 210 shows a negative roll (e.g., head tilted to its left). Numeral 214 shows an attendee head facing forward, with no yaw bias. Numeral 212 shows a positive yaw (e.g., head turned to its right) and numeral 216 shows a negative yaw (e.g., head turned to its left). Attendee heads may move frequently during a meeting, and the electronic device 122 (FIG. 1) may use machine learning techniques (e.g., OpenPose, HigherHRNet Human Pose Estimation, DeepCut Pose Estimation, PoseNet, Dense Pose) to determine the roll, pitch, and yaw of each attendee head.

Figure 3:
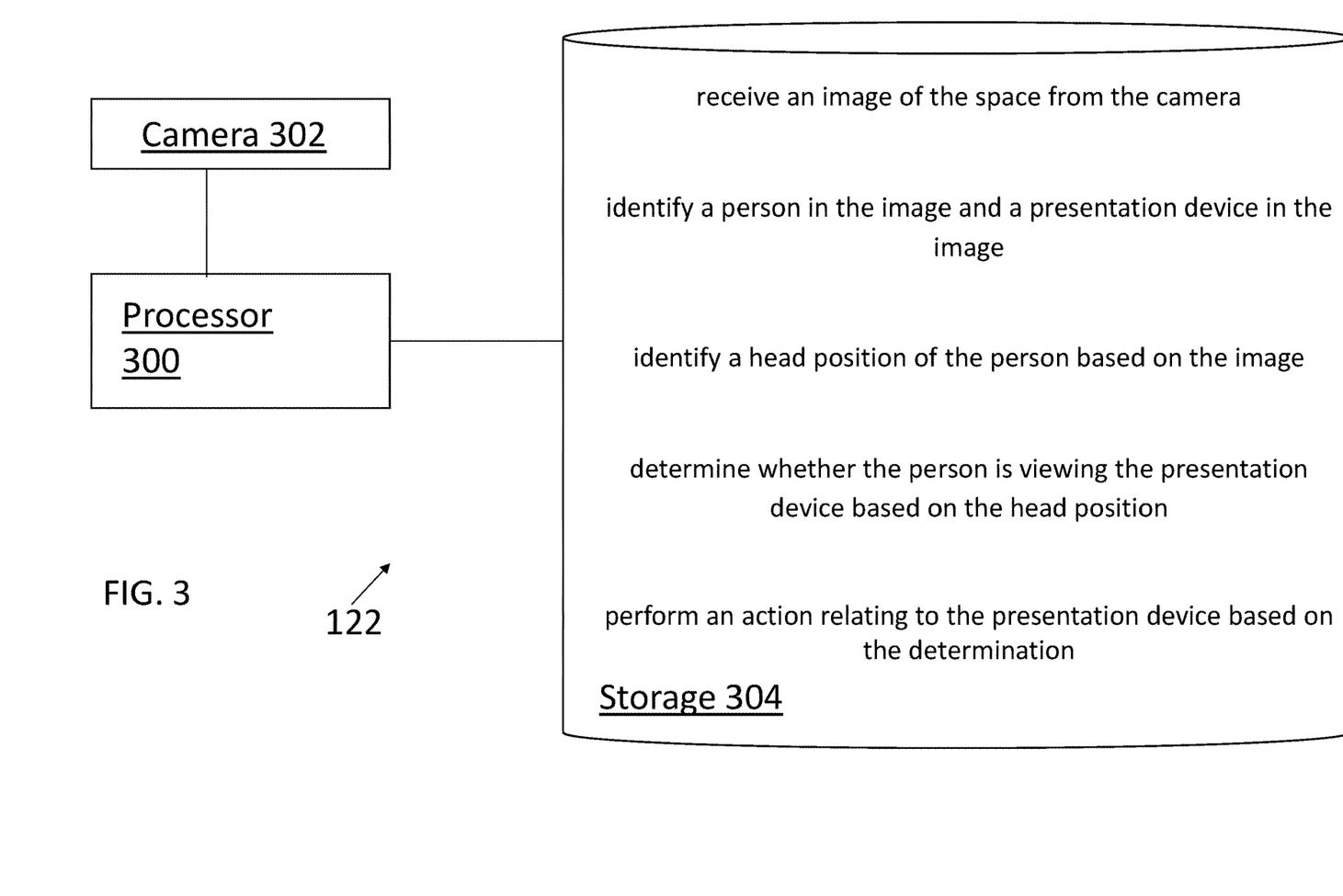
FIGS. 3-5 are block diagrams of an electronic device to control presentation devices based on meeting attendee head positions, in accordance with various examples.
Figure 4:
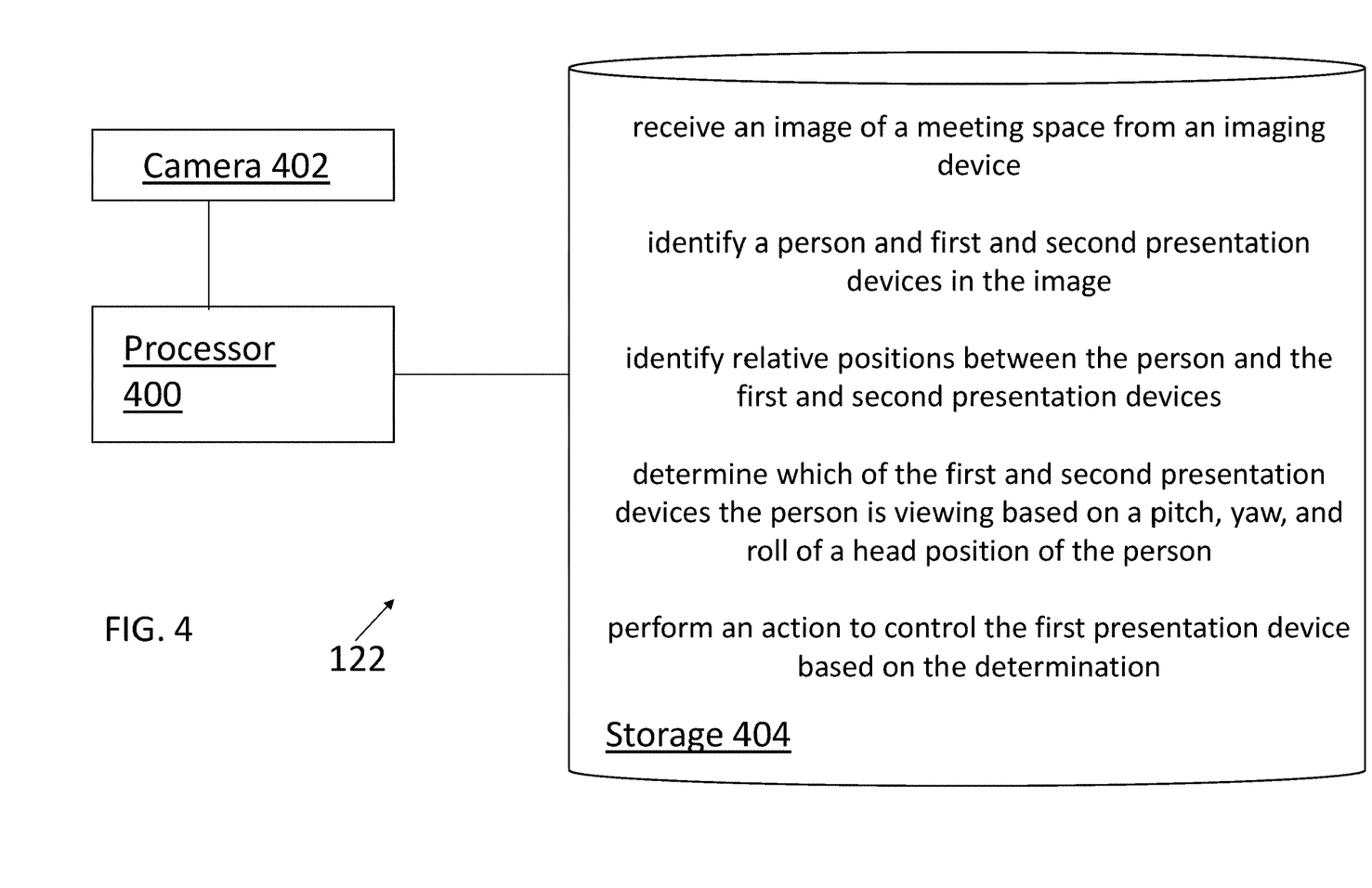
Figure 5:
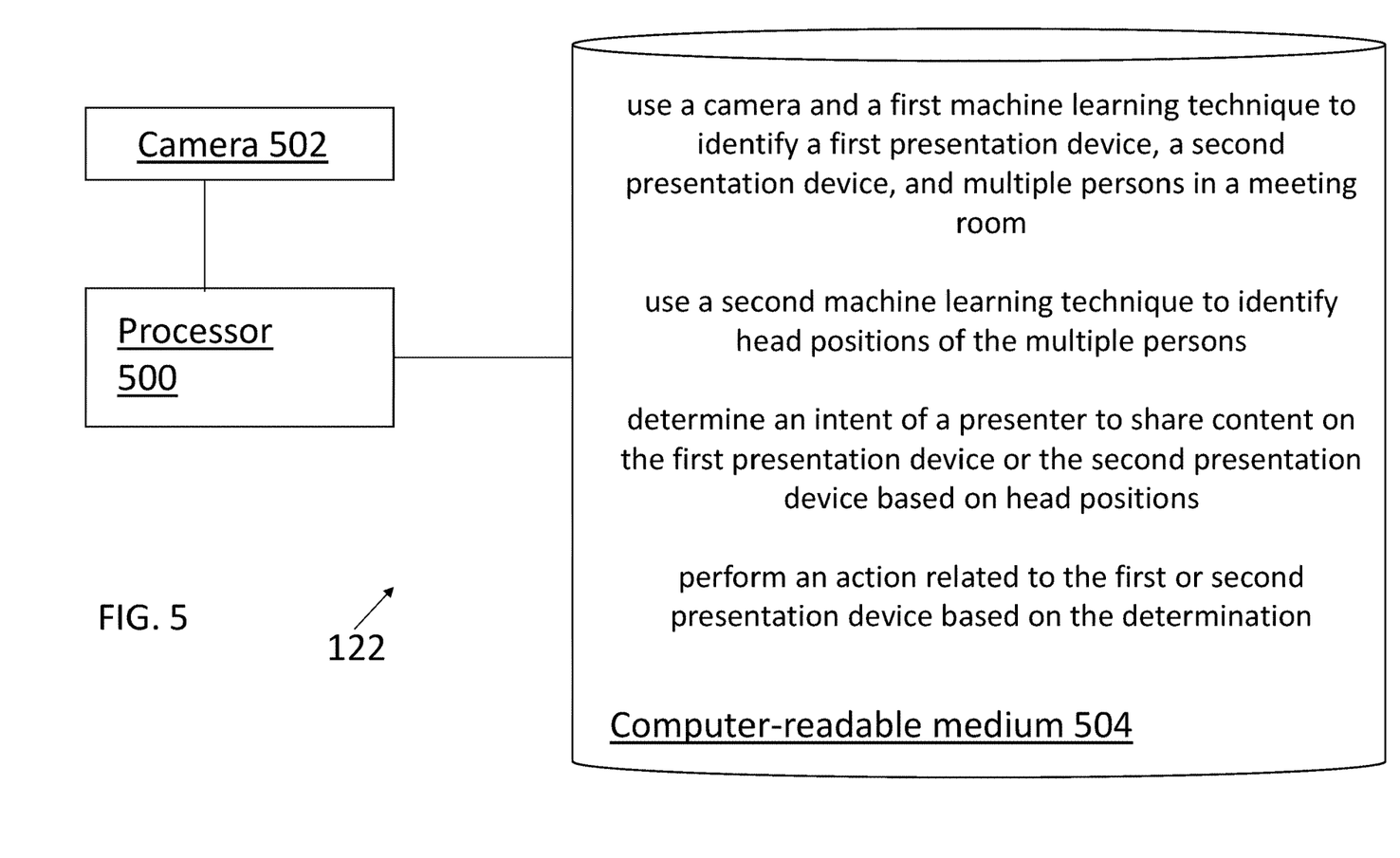

FIGS. 3-5 are block diagrams of an electronic device 122 (FIG. 1) to control presentation devices based on meeting attendee head positions, in accordance with various examples. In FIG. 3, the example electronic device 122 includes a processor 300, a camera 302 coupled to the processor 300, and storage 304 (e.g., random access memory, read-only memory) coupled to the processor 300.

The storage 304 stores executable code, which, when executed by the processor 300, causes the processor 300 to perform some or all of the actions attributed herein to the processor 300 and/or to the electronic device 122. The processor 300 may receive an image of a meeting space from the camera. For example, the processor 300 may receive an image (e.g., a static image or a video stream) of the meeting room 100 from the camera 302. The processor 300 may use machine learning techniques (e.g., You Only Look Once (YOLO), Single Shot detector, Regional-Based Convolutional Neural Network (R-CNN), MobileNet, or SqueezeDet machine learning technique) to identify a person in the image and a presentation device in the image. For example, the processor 300 may identify the attendee 114 and the presentation devices 118, 120. A machine learning algorithm may be trained using a training data set of various presentation devices, conference tables, windows, window treatments, humans, and other items that are commonly present in meeting spaces.

The processor 300 may identify a head position of the person based on the image. For example, the processor 300 may use machine learning techniques (e.g., trained to determine the pitch, roll, and yaw of a human head) to determine the head position of the attendee 114.

The processor 300 may determine whether the attendee is viewing the presentation device based on the identified attendee head position. For example, the processor 300 may determine whether the attendee 114 is viewing, or is about to view, the presentation device 118 or 120 based on the identified head position of attendee 114. Such a determination may include comparing the relative positions of the presentation devices 118, 120 and the attendee and combining the comparison with the head position of the attendee 114 to identify which of the presentation devices 118, 120 the attendee 114 is viewing or is beginning to view.

The processor 300 may perform an action relating to the presentation device based on the determination. For example, the processor 300 may determine that the attendee 114 is viewing the presentation device 118 and is not viewing the presentation device 120. This may indicate that the presenter at the meeting is about to begin presenting using the presentation device 118 and not the presentation device 120. Accordingly, the processor 300 may perform one or more actions to facilitate observation of the presentation device 118 (e.g., turn on, increase illumination, increase sound volume, control content, capture an image of, adjust angle by manipulating a mechanical arm supporting the presentation device 118) and to impede observation of the presentation device 120 (e.g., turn off, decrease illumination, decrease sound volume, adjust angle by manipulating a mechanical arm supporting the presentation device 120). The processor 300 may adjust the window 123 and/or window treatments 124, for example, by opening or closing the window 123 and/or the window treatments 124 to increase or decrease illumination of particular areas of the meeting room 100.

Prior to surveilling the meeting room 100 and identifying objects in the meeting room 100, the electronic device 122 (and, more specifically, the processor 300) may not have established communications with either of the presentation devices 118, 120. However, upon identifying the presentation devices 118, 120, the electronic device 122 may establish communication with the presentation devices 118, 120 to subsequently control the presentation devices 118, 120 as described above. For example, the electronic device 122 may display a message or send a text message or email to an attendee in the meeting room 100, requesting that the attendee establish communication between the electronic device 122 and the presentation devices 118, 120. In examples, the electronic device 122 may use a wireless protocol, such as BLUETOOTH®, to establish communications with the presentation devices 118, 120. In examples, the electronic device 122 may establish communications with the presentation devices 118, 120 using a wireless network (e.g., a private, secure network). Other techniques for establishing communications between the electronic device 122 and the presentation devices 118, 120 are contemplated and included in the scope of this disclosure.

In FIG. 4, the example electronic device 122 includes a processor 400, a camera 402 coupled to the processor 400, and storage 404 (e.g., random access memory, read-only memory) coupled to the processor 400. The storage 404 stores executable code, which, when executed by the processor 400, causes the processor 400 to perform some or all of the actions attributed herein to the processor 400 and/or to the electronic device 122. The processor 400 may receive an image (e.g., a static image or a video stream, captured by the camera 402) of the meeting room 100 from an imaging device (e.g., camera 402), as described above. The processor 400 may identify a person in the image and first and second presentation devices in the image. For example, the processor 400 may identify the attendee 114 and the presentation devices 118, 120. In examples, the processor 400 uses machine learning techniques to perform such identifications, as described above.

The processor 400 may identify relative positions of the person and the first and second presentation devices. For example, the processor 400 may use image processing techniques to determine the relative position of the attendee 114 and the presentation devices 118, 120. For instance, the processor 400 may determine the presentation device 120 is directly to the right of the attendee 114 and the presentation device 118 is in front of and to the right of the attendee 114.

The processor 400 may determine which of the first and second presentation devices the attendee is viewing (or is beginning to view) based on a pitch, yaw, and roll of a head position of the attendee. For example, the processor 400 may use machine learning techniques to determine the pitch, yaw, and roll of the head of the attendee 114. The processor 400 may, for instance, determine that the attendee 114 has a head position that includes a positive pitch, a positive yaw, and a negative roll (FIG. 2). The processor 400 may, in examples, determine the degrees of pitch, yaw, and/or roll. The processor 400 may compare this head position to the locations of the presentation devices 118, 120 relative to the attendee 114 and determine that the attendee 114 is viewing the presentation device 120, not the presentation device 118 (FIG. 1).

The processor 400 may perform an action relating to the first presentation device based on the determination. For example, the processor may turn on and illuminate the presentation device 120 and may place the presentation device 118 in a hibernation mode to conserve power and to avoid drawing attention to the presentation device 118.

In FIG. 5, the example electronic device 122 includes a processor 500, a camera 502 coupled to the processor 500, and storage 504 (e.g., random access memory, read-only memory) coupled to the processor 500. The storage 504 stores executable code, which, when executed by the processor 500, causes the processor 500 to perform some or all of the actions attributed herein to the processor 500 and/or to the electronic device 122. The processor 500 may use a camera and a first machine learning technique to identify a first presentation device, a second presentation device, and multiple persons in a meeting room. For example, the processor 500 may use the camera 502 and a first machine learning technique to identify the presentation devices 118, 120 and the attendees 104, 106, 108, 110, 112, 114, and 116.

The processor 500 may use a second machine learning technique to identify head positions of the multiple persons. For example, the processor 500 may use a second machine learning technique to determine pitch, roll, and yaw (and/or degrees of pitch, roll, and/or yaw) of each attendee's head.

The processor 500 may then determine an intent of a presenter to share content on the first presentation device or second presentation device based on the attendee head positions. For example, the processor 500 may determine which of the first and second presentation devices a majority of the multiple persons is viewing based on the head positions. For instance, the processor 500 may determine that a majority (e.g., four attendees) of the attendees 104, 106, 108, 110, 112, 114, and 116 is viewing the presentation device 118 and not the presentation device 120. In examples, the processor 500 may determine that a specific threshold number of the attendees 104, 106, 108, 110, 112, 114, and 116 is viewing the presentation device 118 and not the presentation device 120. The processor 500 may conclude that the presenter intends to share content on the presentation device 118 and not on the presentation device 120.

The processor 500 may perform an action related to the first or second presentation device based on the determination. For example, the processor 500 may turn on, illuminate, control content of, or increase the sound volume of the presentation device 118, and the processor 500 may turn off, darken, or decrease the sound volume of the presentation device 120. In examples, the processor 500 may control the window 123 and/or the window treatments 124 (FIG. 1).

The above description is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
a camera to capture an image of a spatial environment; and
a processor coupled to the camera,
wherein, in response to receiving the image, the processor is to:
determine, for a person in the image, degrees of pitch, yaw, and roll of a head of the person;
identify, from the pitch, yaw, and roll of the head, a head position of the person in the image;
identify, by detecting a presentation device in the image, a spatial position of the presentation device in the spatial environment;
determine, based on the head position of the person relative to the spatial position of the presentation device, whether the person in the image is viewing the presentation device; and
execute, in response to determining that the person in the image is viewing the presentation device, an action to manipulate an operation of the presentation device.

2. The electronic device of claim 1, wherein the processor is to use a machine learning technique to identify the person and the presentation device in the image.

3. The electronic device of claim 1, wherein the processor is to use a machine learning technique to identify the head position of the person.

4. The electronic device of claim 1, wherein the presentation device is a whiteboard or a projector.

5. The electronic device of claim 1, wherein the processor is to perform the action by controlling an illumination level of the presentation device.

6. The electronic device of claim 1, wherein the processor is to decrease an illumination level of a second presentation device based on the determination.

7. The electronic device of claim 1, wherein the processor is to control an illumination of the space based on the determination.

8. An electronic device, comprising:
a processor to:
receive an image of a meeting space from an imaging device;
identify, in the image, relative spatial positions of a person, a first presentation device, and a second presentation device;
determine, from the image, degrees of pitch, yaw, and roll of a head position of the person;
determine that the person is viewing the first presentation device based on the head position of the person; and
perform, upon determining that the person is viewing the first presentation device based on the head position of the person, an action to manipulate operation of the first presentation device.

9. The electronic device of claim 8, wherein the processor is to use a machine learning technique to identify the person and the first and second presentation devices in the image.

10. The electronic device of claim 9, wherein the machine learning technique is a You Only Look Once (YOLO), Single Shot detector, Regional-Based Convolutional Neural Network (R-CNN), MobileNet, or SqueezeDet machine learning technique.

11. The electronic device of claim 8, wherein the processor is to use a machine learning technique to determine the pitch, yaw, and roll.

12. The electronic device of claim 8, wherein the processor is to control window blinds or window curtains in the meeting space based on the determination.

13. The electronic device of claim 8, wherein the processor is to control the first presentation device by adjusting an illumination level of the first presentation device.

14. The electronic device of claim 8, wherein the processor is to perform the action by controlling content shown on the first presentation device.

15. The electronic device of claim 8, wherein the processor is to cause a camera to capture the first presentation device based on the determination.

16. The electronic device of claim 8, wherein the processor is to deactivate the second presentation device based on the determination.

17. A non-transitory computer-readable medium storing executable code, which, when executed by a processor, causes the processor to:
use a camera and a first machine learning technique to identify, in an image of a spatial environment captured by the camera, a first presentation device, a second presentation device, and multiple persons in the spatial environment;
use a second machine learning technique to identify, from the image, degrees of pitch, yaw, and roll for head positions of the multiple persons;
determine, based on a comparison between head orientations of the multiple persons and spatial positions of the first and second presentation devices in the image, whether a presenter is directing attention to the first presentation device or the second presentation device; and perform an action to manipulate operation of the first presentation device based on the determination.

18. The non-transitory computer-readable medium of claim 17, wherein the head positions include pitch, yaw, and roll.

19. The non-transitory computer-readable medium of claim 17, wherein execution of the executable code causes the processor to control an illumination level, a content, or a combination thereof of the first presentation device.

20. The electronic device of claim 1, wherein the operation is from the group consisting of:
- a power adjustment of the presentation device,
- a volume adjustment of the presentation device,
- an illumination adjustment of the presentation device, and
- a content control on the presentation device.

* * * * *